United States Patent
Arima (10) Patent No.: US 6,208,611 B1
(45) Date of Patent: *Mar. 27, 2001

(54) LIGHT EXPOSURE APPARATUS FOR MASTER OPTICAL DISC

(75) Inventor: Mitsuo Arima, Miyagi (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/084,369

(22) Filed: May 27, 1998

(30) Foreign Application Priority Data

May 28, 1997 (JP) .................................. 09-138924

(51) Int. Cl.$^7$ ....................................................... G11B 7/00
(52) U.S. Cl. .................. 369/112.02; 369/112.24
(58) Field of Search .................. 369/120, 121, 369/112, 44.23, 44.24

(56) References Cited

U.S. PATENT DOCUMENTS

| | | | |
|---|---|---|---|
| 4,889,415 | * 12/1989 | Umezu | 369/44.23 |
| 5,040,165 | * 8/1991 | Taii et al. | 369/44.37 |
| 5,084,856 | * 1/1992 | Henmi et al. | 369/109 |
| 5,084,860 | * 1/1992 | Maeda et al. | 369/44.37 |
| 5,113,385 | * 5/1992 | Osawa | 369/44.37 |
| 5,120,136 | * 6/1992 | Oakley | 369/44.37 |
| 5,605,782 | * 2/1997 | Put et al. | 369/116 |
| 5,610,896 | * 3/1997 | Mochizuki | 369/121 |
| 5,903,533 | * 5/1999 | Horimai | 369/59 |

* cited by examiner

Primary Examiner—Nabil Hindi
(74) Attorney, Agent, or Firm—Sonnnenschein, Nath & Rosenthal (57) ABSTRACT

A light exposure device for a master optical disc capable of exposing to light a desired area of the master optical disc to high precision for forming crests and recesses of broad widths therein to high precision. Specifically, the light exposure device for the master optical disc exposes to light the portions of a photoresist coated on a substrate of the optical disc adapted to form a pre-set pattern corresponding to recorded information signals. The light exposure device for the master optical disc includes a light-condensing optical element 15 for condensing the laser light radiated from a light source, a deflecting optical element 16 for wobbling the laser light condensed by the light-condensing optical element 15 and an optical system 17 arranged downstream of the focal point position of the light-condensing optical element 15 for re-imaging the laser light wobbled by the deflecting optical element 16 at a location upstream of the objective lens.

12 Claims, 5 Drawing Sheets

LIGHT EXPOSURE APPARATUS FOR MASTER OPTICAL DISC

BACKGROUND OF THE INVENTION

1. Field of the invention

This invention relates to a light exposure device for a master optical disc used as a master disc in manufacturing an optical disc formed with pits and grooves for exposing the master optical disc to light.

2. Related Art

In general, a recordable optical disc is formed with concentric grooves or a spirally extending groove. There is an optical disc of the groove-recording type in which information signals are recorded in the grooved portion. There is also an optical disc of the land-recording type in which information signals are recorded on lands which are protuberant portions formed between neighboring turns of the groove(s). There is further an optical disc of the land-and-groove recording type in which the information signals are recorded in the groove(s) and the lands.

In any of these systems, a master optical disc is prepared in the so-called mastering process, and the optical discs are prepared from the master disc, a father disc, a mother disc and a stamper. That is, in producing an optical disc, a master optical disc having crests and valleys corresponding to the groove(s) and lands formed to high precision is required. In the following description, the portions formed in the master optical disc in register with pits of the optical disc are termed "pit-forming portions", while the portions similarly formed in the master optical disc in register with groove(s) of the optical disc are termed "groove-forming portions".

When preparing the master optical disc, a laser light beam is illuminated on a photoresist coated to a pre-set thickness on a glass substrate for forming the pit-forming and groove-forming portions by light exposure. That is, with the master optical disc, the laser light beam is illuminated on the pit-forming and groove-forming portions, and the areas of the photoresist illuminated by the laser light beam are etched during the development process, while the areas thereof other than those illuminated by the laser light beam are cured. This forms the pit-forming portions and the groove-forming portions having the desired shape on the master optical disc.

In illuminating the laser light beam on the photoresist, the wobbling method, as described in Japanese Laying-Open Patent Publication 64-35742, is used. With the wobbling method, the laser light beam illuminated on the photoresist is oscillated along the radius of the master optical disc for forming pits and groove(s) to wider widths.

Figure 1:
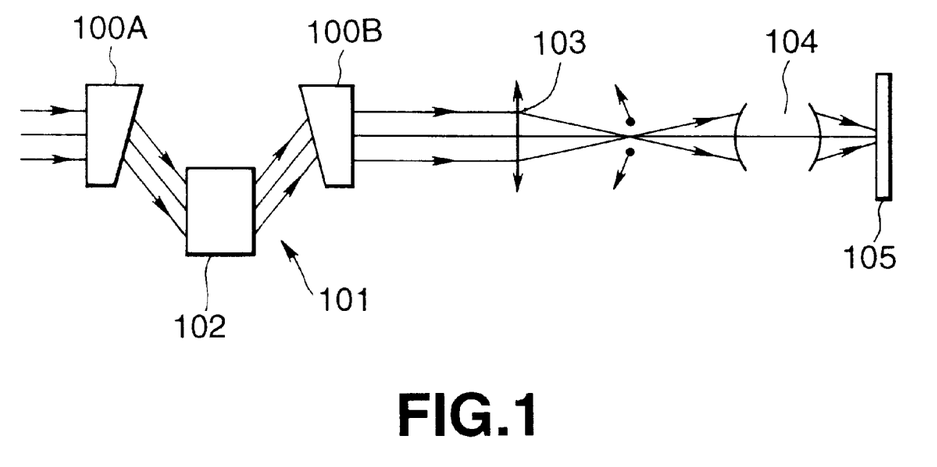
FIG. 1 shows the optical path of essential portions of the conventional light exposure device.

For effectuating light exposure using this wobbling method, a light exposure device 101 having a pair of wedge-shaped cylindrical lenses 100A, 100B, as shown in FIG. 1, is used. The light exposure device 101 includes a light source, not shown, for radiating a laser light beam, the paired cylindrical lenses 100A, 100B, arranged on the optical axis of the laser light beam radiated from the light source, an acoustic optical element 102, arranged between the paired wedge-shaped cylindrical lenses 100A, 100B, a light condenser lens 103 arranged on the optical axis of the laser light transmitted through the for condensing the laser light wedge-shaped cylindrical lenses 100A, 100B and an objective lens 104 arranged downstream of the focal point position of the light condenser lens 103.

In the light exposure device 101, the laser light transmitted through the paired wedge-shaped cylindrical lenses 100A, 100B has its pre-set direction condensed, while having its direction perpendicular thereto collimated so as to enter the acoustic optical element 102. That is, the laser light entering the acoustic optical element 102 is in the form substantially of a spot having the direction of light condensation as the longitudinal direction.

The acoustic optical element 102 wobbles the laser light entered thereto in a state in which compression waves of preset frequencies are superimposed thereon. The compression waves are superimposed from the direction parallel to the longitudinal direction of the substantially linear spot shape for wobbling the laser light.

The laser light beam wobbled by the acoustic optical element 102 is restored to its original shape, as it is transmitted through the opposite side wedge-shaped cylindrical lens 100B, so as to be illuminated on the condenser lens 103. The condenser lens 103, having its focal point position upstream of the objective lens 104, condenses the wobbled laser light on its focal point position. The wobbled laser light is exposed to the master optical disc 105 via the objective lens 104.

Figure 2:
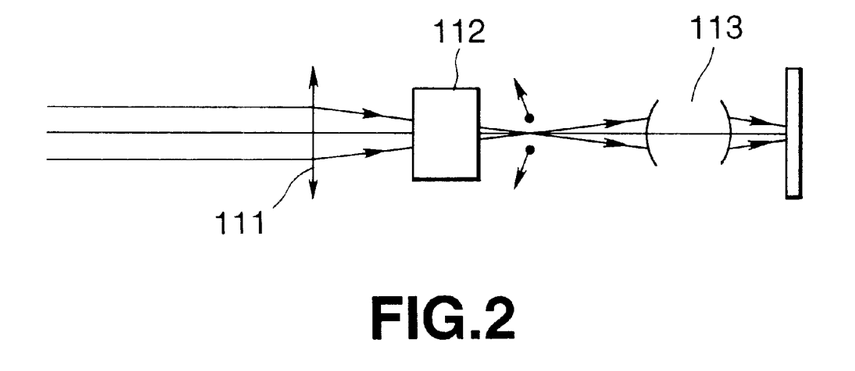
FIG. 2 shows the optical path of essential portions of the conventional light exposure device.

When the master optical disc is exposed to light by the wobbling method, a light exposure device 110 is sometime used, as shown in FIG. 2. This light exposure device 110 includes a light source, not shown, a light condenser lens 111 arranged on the optical axis of the laser light outgoing from the light source, an acoustic optical element 112 arranged upstream of the light condenser lens 111 and an objective lens 113 arranged downstream of the focal point of the light condenser lens 111.

With the light exposure device 110, the laser light outgoing from the light source is condensed by the light condenser lens 111 so as to enter the acoustic optical element 112 at a point ahead of the focal point position. Similarly to the above-described acoustic optical element 102 of the light exposure device 101, the acoustic optical element 112 superimposes the compression waves on the laser light. The laser light entering the acoustic optical element 112 of the light exposure device 110 has its profile changed to a circular shape. The wobbled laser light is exposed via objective lens 113 on a master optical disc 114.

Meanwhile, for manufacturing a master optical disc, having crests and valleys formed to high precision by the wobbling method, it may be contemplated to use the compression wave of high frequency in the above-described acoustic optical elements 102, 112. That is, by using high-frequency compression waves, the oscillations of the wobbled laser light can be increased to enable the edges of the light-exposed area to be formed to high precision. For forming pits or grooves of broader widths by the wobbling method, it may be contemplated to increase the amplitude of the wobbled laser light.

In the light exposure device 101, shown in FIG. 1, the acoustic optical element 102 superimposes the compression wave on the laser light, condensed to a substantially linear light beam, from the direction parallel to the longitudinal direction of the spot shape. If, in the present light exposure device, the high frequency compression wave is used, the longitudinal width of the spot shape is substantially equal to the wavelength of the compression wave. This renders the direction of diffraction of the laser light in the light flux to be non-uniform to cause scattering of the laser light. Thus, in this case, the wobbled laser light exposing the master optical disc to light is not of the desired spot shape.

Consequently, the master optical disc is exposed to light in areas other than desired areas, so that the disc cannot have the pit-forming portion or the groove-forming portion of desired shape. That is, the above-described light exposure device has a drawback that it is difficult to perform light exposure so that the pit-forming portions and the groove-forming portions will present the shape of recesses and crests of high precision.

On the other hand, in the above-described light exposure device 110, the acoustic optical element 112 is arranged upstream of the focal point position of the light condenser lens 111. Also, in this case, since the acoustic optical element 112 uses compression waves of high frequency, the laser light of a small spot diameter needs to be supplied.

In this case, the acoustic optical element 112 needs to be arranged in the vicinity of the focal point position of the light condenser lens 111. The light deflection by the acoustic optical element 112 becomes smaller the closer the acoustic optical element 112 is arranged towards the focal point position of the light condenser lens 111 in association with the compression waves of higher frequency. That is, in the present light exposure device 110, the laser light is of a small amplitude.

Thus, the above-described light exposure device 110 has a drawback that the master optical disc cannot be exposed to light in register with the groove-forming portion or the pit-forming portion adapted for forming larger wobbling pits.

SUMMARY OF THE INVENTION

It is therefore an object of the present invention to provide a light exposure device in which any desired portion thereof can be exposed to light to high precision for forming recesses and crests of high precision and broader width on the master optical disc.

To this end, the present invention provides a light exposure device for a master optical disc for exposing to light the portions of a photoresist coated on the master optical disc in register with a pre-set pattern carrying recorded information signals including a light condensing optical element for condensing the laser light radiated from a light source, a deflecting optical element for condensing the laser light radiated from the light condensing optical element, and an optical system arranged downstream of the focal point position of the light-condensing optical element for re-imaging the laser light wobbled by the deflecting optical element upstream of an objective lens.

The light exposure device for the master optical disc according to the present invention, as described above, includes the deflecting optical element at a pre-set position from the focal point position of the light-condensing optical element. In this light exposure device, a laser light beam of a small spot diameter is illuminated on the deflecting optical element. Consequently, the defecting optical element of the light exposure device wobbles the laser light of the small spot diameter, thus assuring optimum wobbling of the laser light beam.

The optical system of the light exposure device re-images the laser light beam wobbled by the defecting optical element at a desired focal length. Thus, the light exposure device can set the amplitude of the re-imaged laser light to a pre-set value. That is, with the present light exposure device, the amplitude of the wobbled laser light can be adjusted by the optical system to expose the master optical disc with the laser light wobbled to the desired amplitude.

With the light exposure device for the master optical disc according to the present invention, the laser light can be wobbled satisfactorily even if the compression wave of a higher frequency is used, while the wobbled laser light can be increased in amplitude. Thus, with the light exposure device for the master optical disc, a master optical disc can be produced which is high in precision and which has crests and recesses of broader widths.

DESCRIPTION OF PREFERRED EMBODIMENTS

Referring to the drawings, preferred embodiments of a light exposure device for a master optical disc according to the present invention will be explained in detail.

The light exposure device for the master optical disc is used for forming an optical disc, exemplified by a magneto-optical disc and which is formed with pits as information signals and a groove as a guide groove for tracking servo.

Figure 3:
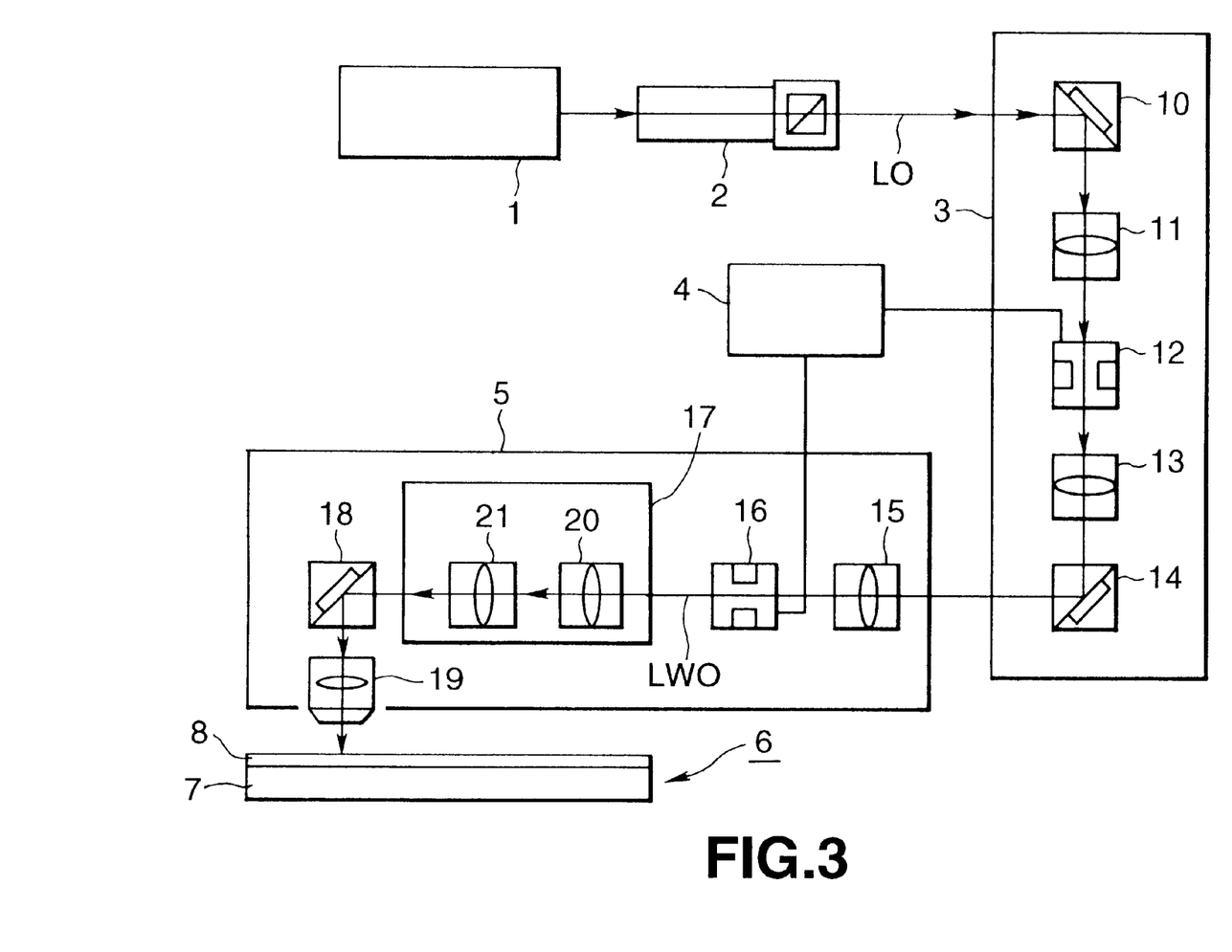
FIG. 3 shows the structure of a light exposure device for a master optical disc according to the present invention.

Referring to FIG. 3, the light exposure device for the master optical disc includes a laser light source 1 for radiating the laser light, a first optical modulating element 2 for power control, a laser adjustment unit 3 for adjusting the spot diameter of the laser light, a controller 4 for supplying the control signal to the laser adjustment unit 3 and a laser light illuminating portion 5. The light exposure device illuminates the wobbled laser light on a pre-set area of the master optical disc 6.

The master optical disc 6 includes a substantially disc-shaped substrate 7 of glass or the like and a photoresist layer 8 formed on the substrate 7. The portions of the photoresist layer 8 in register with the pits of the optical disc are formed with pit-forming portions, while the portions of the optical disc in register with the grooves are formed with groove-forming portions. These pit- and groove-forming portions are formed as recesses.

For producing the master optical disc 8, the photoresist layer 8 is first formed to a pre-set film thickness on the glass substrate 7. The substrate 7 used is planarized to a high degree and has its surface freed of deposited dust and dirt.

A photoresist is coated on this highly planarized surface. At this time, the photoresist may be formed on a thin metal layer such as a chromium layer or a primer layer of an organic material, such as a silane coupling agent, formed on the substrate 7.

The photoresist layer 8 is coated to a precisely controlled film thickness for prescribing the depth of the pit-forming and groove-forming portions. For controlling the film thickness of the photoresist layer 8, an ellipsometer may be used, or the film thickness may be calculated from the reflectance value.

In the light exposure device, the laser adjustment unit 3 includes a first mirror 10 for refracting the laser light reflected from the laser light source 1, and a first lens 11, a second optical modulation element 12, a second lens 13 and a second mirror 14, arranged in this order on the optical axis of the laser light reflected by the first mirror 10. In the present laser adjustment unit 3, the second optical modulation element 12 is connected to the controller 4.

The laser light illuminating portion 5, on which is incident the laser light radiated by the laser light source 1, includes a first light collecting lens 15, an acoustic optical element 16, as a deflecting optical element, an optical system 17, a third mirror 18 and an objective lens 19, arranged in this order on the optical path of the laser light. In the laser light illuminating portion 5, the optical system 17 includes a collimator lens 20 and a second light condenser lens 21 in this order on the optical axis of the laser light.

Figure 4:
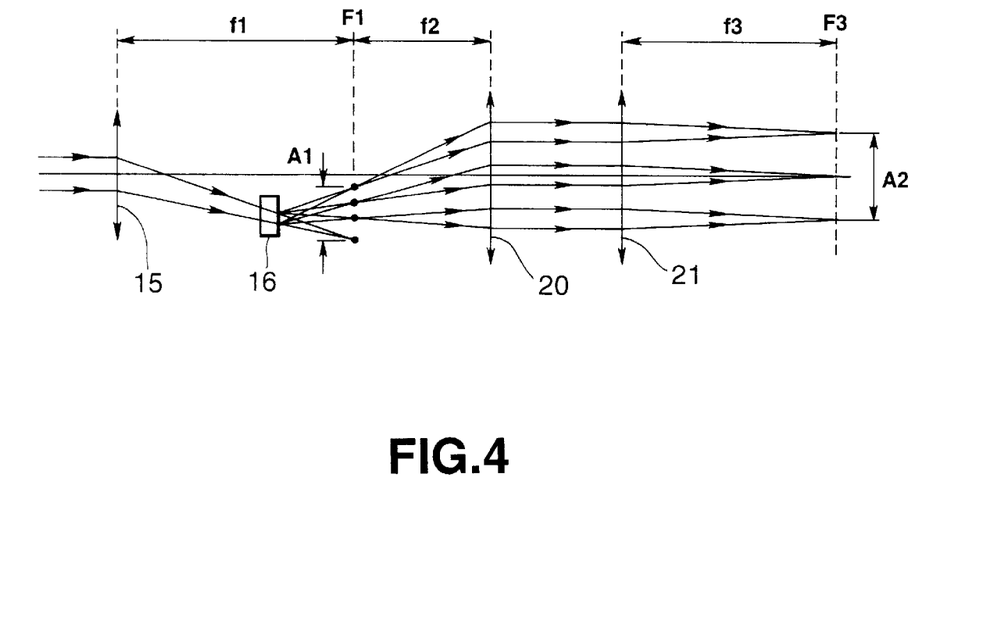
FIG. 4 shows the optical path of essential parts of a laser illuminating portion in the light exposure device.

In the present light exposure device, the acoustic optical element 16 is arranged within one-half of the focal length (f1 in FIG. 4) from the focal point position of the first light collecting lens 15, on the optical axis of the diffracted light of the first light collecting lens 15, as shown in FIG. 4. This acoustic optical element 16 is connected to the controller 4 so that a compression wave of a higher frequency of the order of 5 MHz is superimposed on the laser light. Specifically, a laser light beam having the shape of a substantially linear spot falls on the acoustic optical element 16 fed with a compression wave having a pre-set frequency. At this time, the compression wave is supplied to the acoustic optical element from the longitudinal direction of the linear shape of the spot of the incident laser light. Stated differently, the compression wave is supplied to the acoustic optical element from the longitudinal direction of the spot shape of the incident laser light. This wobbles the laser light incident on the acoustic optical element at an amplitude A1 shown in FIG. 4 at a pre-set frequency.

In the present light exposure device, the optical system 17 includes a collimator lens 20 and the second light condenser lens 21 in this order on the optical axis of the laser light wobbled by the acoustic optical element 16, as shown in FIG. 4. The laser light wobbled by the acoustic optical element 16 means the first-order diffracted light diffracted within the acoustic optical element 16.

In the optical system 17, the collimator lens 20 is arranged downstream of the focal point position of the first light collecting lens 15. The collimator lens 20 is arranged downstream of the focal point position F1 of the first light collecting lens 15 by a distance f2 shown in FIG. 4. The second light condenser lens 21 is arranged on the optical path of the laser light radiated from the collimator lens 20 and has a focal point position F3 shown as a focal length f3 in FIG. 4. In the present optical system 17, the amplitude of the laser LW0 at the focal point position F3 is indicated as A2.

In the present light exposure device, the above-described collimator lens 20 is movable in a direction parallel to the optical axis. That is, with the present optical system 17, the distance f2 from the focal point position F1 of the first light collecting lens 15 to the collimator lens 20 can be set to a desired magnitude. Also, in the present light exposure device, the second light condenser lens 21 has a fixed focal point position F3 and a desired focal point distance f3.

In order for the focal length f3 to have a desired value, the second light condenser lens 21 is preferably designed as varifocal lens.

With the above-described light exposure device, the wobbled laser light beam is illuminated on the photoresist layer 8 for light-exposure of the areas of the photoresist layer 8 in register with the pit forming portions and groove forming portions.

In the light exposure device, the pre-set laser light beam is radiated from the laser light source 1 to fall on the first optical modulating element 2. The laser light beam radiated from the laser light source 1 is power-controlled in the first optical modulating element 2 so as to be turned into laser light L0. The first optical modulating element 2 which modulates the intensity of the incident laser light beam suffices such that the first optical modulating element 2 may be designed to perform opto-electric modulation, acousto-optical modulation or photomagnetic modulation.

The laser light thus modulated in intensity falls on the laser adjustment unit 3. This laser adjustment unit 3 is adapted to turn the laser L0 on and off for exposing to light the portions of the photoresist layer 8 in register with the pit-forming and groove-forming portions.

In the laser adjustment unit 3, the laser light L0 is refracted by the first mirror 10 to fall on the first lens 11.

The laser light L0 is formed by the first lens 11 into a spot of a pre-set diameter to fall on the second optical modulation element 12. This second optical modulation element 12 is fed with a control signal from the controller 4 to transmit or shield the incident laser light L0. The second optical modulation element 12 may, for example, be designed as an acousto-optical type modulator.

The controller 4 manages control to transmit or to shield the laser light L0 when the laser light illuminated on the photoresist layer 8 is or is not in the pit-forming portions or in the groove-forming portions, respectively. Thus, in the present light exposure device, only the portions of the photoresist layer 8 in register with the pit-forming and groove-forming portions can be exposed to light. The laser light L0 transmitted through the second optical modulation element 12 falls on the second lens 13 for collimation. The collimated laser light L0 is refracted by the second mirror 14 so as to fall on the laser light illuminating portion 5. The laser L0 is collimated in this manner by the laser adjustment unit 3 at a desired timing so as to then fall on the laser light illuminating portion 5.

In the present light exposure device, the incident laser light L0 is wobbled into the laser light LW0 by the acoustic optical element 16 of the laser light illuminating portion 5, as the deflecting optical element, with the laser light LW0 being illuminated on the master optical disc 6.

The laser light L0 radiated from the laser adjustment unit 3 falls on the first light collecting lens 15 of the laser light illuminating portion 5. This first light collecting lens 15 is a lens having the focal length f1, as shown in FIG. 2, and condenses the laser L0 at the focal point position F1. In the laser light illuminating portion 5, the acoustic optical element 16 is arranged on the optical axis of the laser light L0. On the acoustic optical element 16 falls the laser light L0 condensed by the first light collecting lens 15.

This acoustic optical element 16 is arranged at a position within one/half the focal length f1 from the focal point position F1. Thus, the laser light L0 with a small spot size is illuminated via the first light collecting lens 15 on the acoustic optical element 16. In the acoustic optical element 16, the compression wave is superimposed on the illuminated laser light L0 to wobble the laser light L0. The acoustic optical element 16 diffracts the laser light L0 condensed by the first condenser lens 15. From the acoustic optical element 16 is radiated the first-order diffracted light of the diffracted laser light L0.

In the acoustic optical element 16, if the compression wave is of a higher frequency, the spot diameter of the laser light L0 is smaller than the wavelength of the compression wave. Thus, in the acoustic optical element 16, the laser light L0 is uniform in the direction of diffraction in the light beam. such that the laser light is not scattered and deflection by the compression wave is uniform in the light beam.

Therefore, with the laser light illuminating portion 5, the laser light L0 can be wobbled satisfactorily even if the compression wave is of a higher frequency of approximately 6 MHz.

The laser light LW0, wobbled with the amplitude A1, falls on the collimator lens 20. The laser light LW0 is collimated by the collimator lens 20 spaced a distance f2 from the focal point position F1. The laser light LW0, collimated by the collimator lens 20, falls on the second light condenser lens 21 so as to be condensed with the amplitude A2 at the focal point position F3.

In the present light exposure device, the amplitude enlarging factor (A2/A1) of the laser light LW0 can be represented as f3/f2. That is, the laser light LW0 can have a desired amplitude by adjusting the magnitude f3/f2 in the light exposure device shown in FIG. 4. In particular, in the preset light exposure device, the amplitude of the laser light LW0 can be enlarged by satisfying the relation f3>f2.

Therefore, with the present light exposure device, the focal length f2 of the collimator lens 20 and the focal length f3 of the second light condenser lens 21 are adjusted for satisfying the relation f3>f2 when exposing the pit-forming or groove-forming portions to broader widths on the photoresist layer 8. Thus, with the present light exposure device, the pit-forming or groove-forming portions of broader widths can be exposed easily to light.

Specifically, it is sufficient if a varifocal lens capable of varying the foal length f2 without varying the focal point position F1 is used as the collimator lens 20. If the second light condenser lens 21 is the varifocal lens, the focal length f3 can be set to a pre-set value without varying the focal point position F3. With the present light exposure device, the portions of the photoresist layer 8 in register with the pit-forming or groove-forming portions of broader widths can be exposed to laser light.

For increasing the enlarging factor A2/A1 in the present light exposure device, such an optical element is used in which the focal lengths f1 and f2 are varied without varying the focal lengths F1, F2. By arranging this optical element on the optical axis, the enlarging factor A2/A1 may be set to a pre-determined value. In this case, the portions of the photoresist layer 8 in register with the pit-forming or groove-forming portions of broader widths can be exposed easily to light.

After adjustment to the pre-set amplitude by the optical system 17, the laser light LW0 is refracted by the third mirror 18 to fall on the objective lens 19. The laser light LW0 is illuminated via objective lens 19 on the photoresist layer 8. This objective lens 19 has a contracting factor of $1/100$ and contracts the laser light LW0 at the focal point position F3 of the second light condenser lens 21 to $1/100$ in effectuating light exposure.

With the above-described light exposure device of the present embodiment, in which the acoustic optical element 16 is provided within one-half of the focal length f1 from the focal point position F1 of the first light collecting lens 15, the laser light can be satisfactorily wobbled even using the compression wave of a higher frequency of the order of 6 MHz. Thus, the present light exposure device can expose the photoresist layer 8 in register with the pit-forming and groove-forming portions to higher accuracy. Consequently, with the present light exposure device, the master optical disc 6 can be fabricated in which crests and valleys are formed to high precision.

With the light exposure device, the laser light wobbled by the acoustic optical element 15 is re-imaged by the optical system 17. Thus, with the present light exposure device, the amplitude A2 of the laser light wobbled by the acoustic optical element 16 can be set to a pre-determined value. That is, with the present light exposure device, the amplitude Al of the wobbled laser light is adjusted by the optical system 17 so that the laser light can be used to expose the master optical disc 6 with the laser light wobbled with the amplitude A2.

Thus, with the present light exposure device, the portions of the photoresist layer 8 in register with the pit-forming or groove-forming portions of broader widths can be satisfactorily exposed to light by increasing the amplitude A2.

That is, with the present light exposure device, the master optical disc 6 having the pit-forming or groove-forming portions of broader widths can be manufactured easily.

Figure 5:
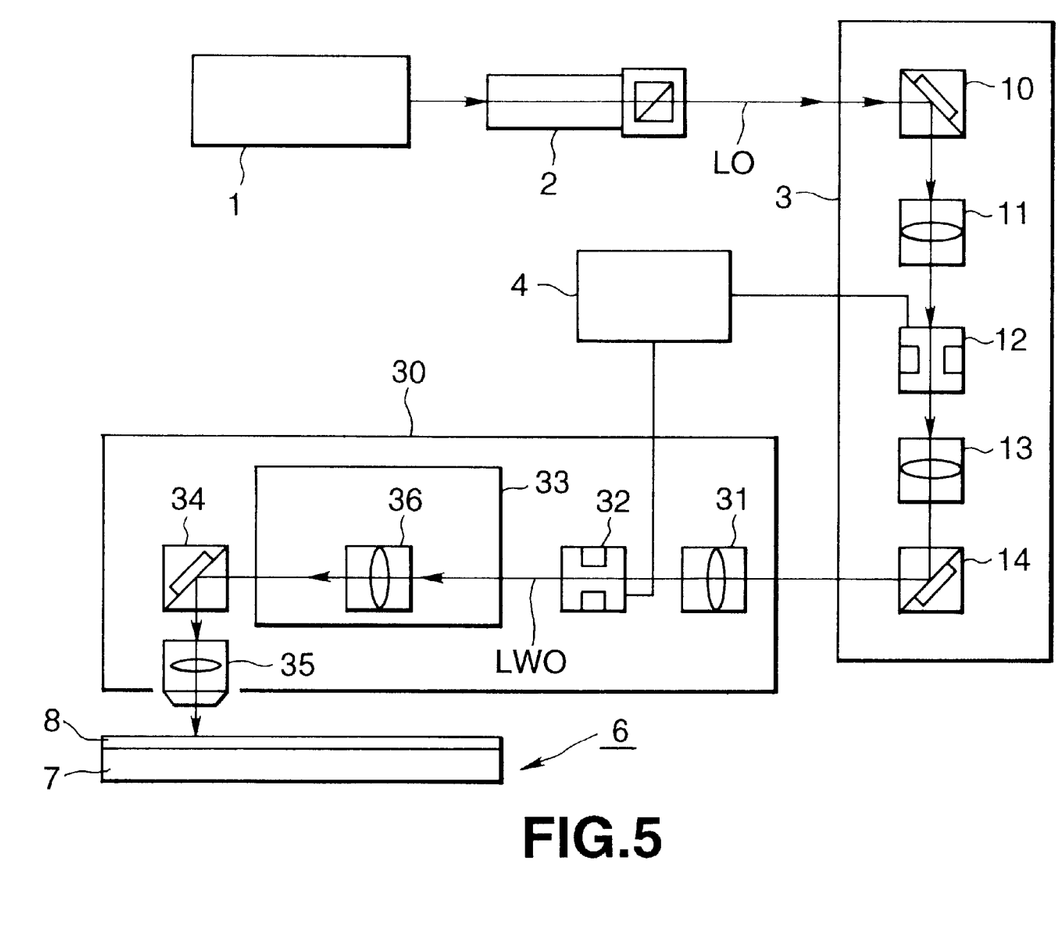
FIG. 5 shows the structure of a light exposure device for another master optical disc according to the present invention.

It should be noted that the light exposure device for the master optical disc according to the present invention is not limited to the light exposure device of the above-described embodiment, but may also be a light exposure device having a modified structure shown in FIG. 5. In the following explanation, the structure which is the same as that of the above-described light exposure device is depicted by the same reference numerals and the structure and operation of the modified embodiment are omitted for simplicity.

The light exposure device shown in FIG. 5 includes a laser light source 1 for radiating the laser light, a first optical modulating element 2 for power control, a laser adjustment unit 3 for adjusting the spot size of the laser light, a controller 4 for supplying the control signal to the laser adjustment unit 3, and a laser light illuminating portion 30 for wobbling the laser light and for illuminating the wobbled laser light.

In the present light exposure device, the laser light illuminating portion 30, on which falls the laser light radiated from the laser adjustment unit 3, includes a first light condenser lens 31, an acoustic optical element 32, as a deflecting optical element, an optical system 33, a third mirror 34 and an objective lens 35, arrayed in this order on the optical axis of the laser light. In the laser light illuminating portion 30, the acoustic optical element 32 is connected to the controller 4. In the laser light illuminating portion 5, the optical system 33 includes a varifocal lens 36 on the optical axis of the laser light.

Figure 6:
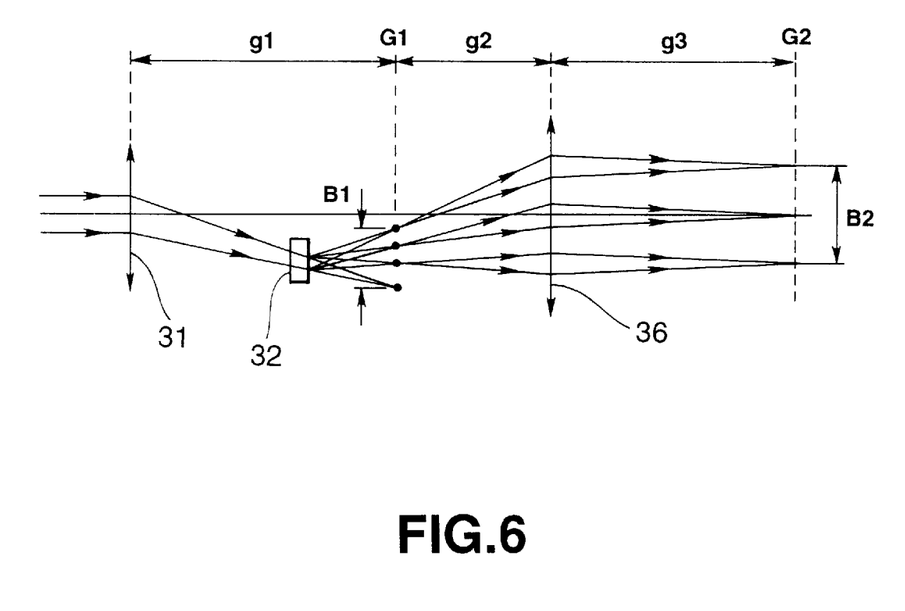
FIG. 6 shows the optical path of essential parts of the laser illuminating portion in the light exposure device shown in FIG. 3.

In the present light exposure device, the acoustic optical element 32 is arranged on the optical axis of the refracted light beam of the first light condenser lens 31 at a distance within one-half of the focal length g1 in FIG. 6 from the focal point position, shown at G1 in FIG. 6, of the first light condenser lens 31, as shown in FIG. 6. The acoustic optical element 32 is connected to the controller 4 to permit the compression wave of a higher frequency of the order of 6 MHz to be superimposed on the laser light. With the present acoustic optical element 32, adapted for superimposing the incident laser light with the compression wave, the laser light is wobbled at the amplitude B1 in FIG. 6 with a pre-set frequency.

Also, in the present light exposure device, the optical system 33 includes the varifocal lens 36 arranged on the optical axis of the laser light wobbled by the acoustic optical element 32. In FIG. 4, the separation between the focal point position G1 of the first light condenser lens 31 and the varifocal lens 36 is indicated as g2, while the focal point position and the focal length of the varifocal lens 36 are indicated as G3 and g3, respectively.

With the light exposure device of the present embodiment, as described above, the first-order diffracted light condensed by the first light condenser lens 31 is wobbled by the acoustic optical element 32 in order to adjust the amplitude of the laser light wobbled by the optical system 33.

That is, with the present light exposure device, the laser light L0 radiated from the laser adjustment unit 3 is condensed by the first light condenser lens 31 to fall on the acoustic optical element 32. Since the acoustic optical element 32 is arranged at a pre-set position, as described above, the laser light L0 incident on the acoustic optical element 32 is of a reduced spot diameter. Thus, with the present light exposure device, the direction of diffraction in the light beam of the superimposed compression wave becomes uniform so that it is deflected uniformly in the light beam. Thus, with the present laser light illuminating portion 30, the laser light L0 can be wobbled satisfactorily even if the compression wave is of a higher frequency of the order of 5 MHz.

The wobbled laser light LW0 is re-imaged by the varifocal lens 36. That is, in the laser light illuminating portion 30, the amplitude B1 of the laser light LW0 at the focal point position G1 is changed to the amplitude B2 of the laser light LW0 at the focal point position G3 of the varifocal lens 36. The amplitude enlarging multiplication factor B2/B1 is indicated as g3/g2. It is however necessary at the same time as this time to adjust the focal point position G1 of the first light condenser lens 31 or the position of the acoustic optical element 32 so that the focal point position g3 will coincide with the object point on the upstream side. Specifically, the optical system 33 needs to be adjusted so that $1/g2-1/g3=1/f3$ in terms of the optical system 17 of FIG. 4 is met.

Therefore, with the present light exposure device, the laser light LW0 can be wobbled at a large amplitude by setting the multiplication factor B2/B1 to not less than unity. Thus, with the light exposure device, the desired areas of the photoresist layer 8 in register with the pit-forming or groove-forming portions of broader widths can be exposed to light to enable a master optical disc to be produced with the pit-forming or groove-forming portions of broader widths.

The light exposure device of the present invention is not limited to that having the acoustic optical elements 16 or 32 as the deflective optical elements. That is, the deflective optical element capable of oscillating the laser light with a pre-set wavelength suffices. For example, the deflective optical element may be designed as the electro-optical or photomagnetic type device.

What is claimed is:

1. A device for exposing portions of photoresist on a master disk to a laser light in registry with a pre-set pattern of recording information signals, the device comprising:
    a first lens positioned downstream of a laser light source for collecting laser light from the source and focusing the light at a focal length point:
    a deflector located downstream of the first lens but upstream of the focal length point of the first lens, the deflector serving to wobble the laser light diffracted from the first lens;
    a lens system located downstream of the deflector and downstream of the focal length point of the first lens and configured to re-image the laser light emitted from the deflector onto a focal length point of the lens system; and
    an objective lens positioned downstream of the lens system to image the laser light on the master disk.

2. The device of claim 1, wherein the lens system comprises a collimator lens located downstream of the deflector and a condenser lens located downstream of the collimator.

3. The device of claim 1, wherein the lens system comprises a varifocal lens.

4. The device of claim 1, wherein the deflector is an acoustical optical element.

5. The device of claim 1, wherein the deflector is located within the first half of the focal length of the first lens.

6. The device of claim 2, wherein the collimator lens is moveable along an optical axis of the laser light collimated by the collimator lens.

7. A device for exposing portions of photoresist on a master disk to a laser light in registry with a pre-set pattern of recording information signals, the device comprising:
    a laser light source;
    a laser light adjustment device located downstream of the laser light source and configured to adjust the spot diameter of the laser light and to control whether a beam emitted from the source is transmitted or not;
    a laser illuminating unit located downstream of the laser light adjustment device, the laser illuminating unit comprising:
    a first lens positioned downstream of a laser light source for imaging laser light from the source onto a focal length point;
    a deflector located downstream of the first lens but upstream of the focal length point of the first lens, the deflector serving to wobble the laser light diffracted from the first lens;
    a lens system located downstream of the deflector and configured to re-image the laser light emitted from the deflector, an objective lens positioned downstream of the lens system to image the laser light on the master disk; and
    a controller operatively coupled to both the laser adjustment device and the deflector to control adjustment of the laser light spot diameter and the wobble of the laser light, respectively.

8. The device of claim 7, wherein the lens system comprises a collimator lens located downstream of the deflector and a condenser lens located downstream of the collimator.

9. The device of claim 7, wherein the lens system comprises a varifocal lens.

10. The device of claim 7, wherein the deflector is an acoustical optical element.

11. The device of claim 7, wherein the deflector is located within the first half of the focal length of the first lens.

12. The device of claim 8, wherein the collimator lens is moveable along an optical axis of the laser light collimated by the collimator lens.

* * * * *